3,303,167
AROMATIC HYDROCARBON-FORMALDEHYDE RESINOUS CONDENSATION PRODUCTS AND PROCESS FOR PRODUCING THE SAME

Hiroshi Kakiuchi, Yokohama, and Hideo Sato, Tokyo, Japan, assignors to Sumitomo Bakelite Company Limited, Tokyo, Japan, a corporation of Japan
No Drawing. Filed Dec. 30, 1964, Ser. No. 422,410
Claims priority, application Japan, May 27, 1960, 35/25,401
13 Claims. (Cl. 260—67)

This application is a continuation-in-part of our application Serial No. 112,193, filed May 24, 1961, now abandoned.

This invention relates to aromatic hydrocarbons-formaldehyde resins containing 7–20% oxygen by weight, and to a process of producing these resins by the reaction between polymeric formaldehyde and benzene and/or toluene with sulfuric acid or perchloric acid as the catalysts.

The reaction between formaldehyde and aromatic hydrocarbons has been investigated for many years. A. Baeyer was the first to report on this subject (Ber., 5, 1098 (1872)), and in 1903 A. M. Nastynkov reported on the reaction between formaldehyde and allene, which was called the formolite reaction (J. Russ. Phys. Chem. Soc., 35, 824 (1903)). During the Second World War, R. Wegler contributed to the understanding of the reaction between formaldehyde and aromatic hydrocarbons (Angew. Chem., A/60, Nr. 4, 88 (1948)). Several investigators reported on the reactions between formaldehyde and polycyclic aromatic hydrocarbons such as acenaphthene or naphthalene. However, the investigations mentioned above dealt with only the reactions between rather reactive aromatic hydrocarbons, such as xylene (especially metaxylene), naphthalene and acenaphthene, and formaldehyde in the presence of much water, that is, aqueous solutions of formaldehyde. Almost no investigation has been done with mono-cyclic aromatic hydrocarbons without any electron-releasing substituent or with only one methyl group such as benzene or toluene, since the electron density of benzene and toluene is low and their reactivity with formaldehyde is very little. Aromatic hydrocarbons with high reactivity, such as xylene, naphthalene and acenaphthene, become resinous to yield useful resins by the reaction with formaldehyde in the presence of some acid catalysts. However, it has been extremely difficult to produce commercially useful resins from the reaction between aqueous formaldehyde solutions and benzene or toluene in the presence of some acid catalysts, because the carbonium ions formed by the protination of formaldehyde attack these aromatic hydrocarbons of low electron density only too slowly.

The aromatic hydrocarbons-formaldehyde resins are known to be the oxygen-containing resins with such linkages as methylene (—CH$_2$—), ether (—CH$_2$—O—CH$_2$—)

and acetal (—(CH$_2$O)$_n$—CH$_2$—) linkages and methylol (—CH$_2$OH) groups. The oxygen-content of these resins must be higher in order that these resins condense with a third material such as phenol to yield the thermosetting resins which are useful as molded articles, laminates or paints.

It is known that the reactions between aqueous formaldehyde solutions and some aromatic hydrocarbons with acid catalysts yield aromatic hydrocarbon resins with the oxygen-content of 5–12% by weight. But the resins were obtained only from such reactive hydrocarbons as xylenes, naphthalene, acenaphthene, and the resins thus prepared contain mainly methylene, and ether linkages, and methylol groups with almost no acetal linkage, since these resins are prepared by using aqueous formaldehyde solutions, in which formaldehyde molecules exist as methylene-glycols. When benzene or toluene is treated with aqueous formaldehyde solutions as in the cases of xylene, naphthalene or acenaphthene, the production of resinous materials is extremely difficult, because of the low reactivity of benzene or toluene. Even when some resinous materials were obtained, such resinous materials were of no practical value, since the resins thus obtained possessed small molecular weight and small viscosity and the resins thus obtained contained mainly methylene linkages and very little, if any, methylol groups and ether linkages. Moreover, it is impossible to use the methods as the commercial processes of production, since the yields of resins were so low and the reactions required very long time.

The object of this invention is to provide the benzene- and/or toluene-formaldehyde resins which are useful.

The object of this invention is to provide the acetal-rich benzene and/or toluene-formaldehyde resins, which possess the oxygen content of 7–20% by weight, the molecular weight of 250–700, the viscosity of 200–80,000 centipoises (30° C.) and the specific gravity of 1.06–1.14 (30° C.).

Another object of this invention is to provide the useful benzene- and/or toluene-formaldehyde resins in very good yields.

As for the production of resins from formaldehyde and benzene and/or toluene, we have found that the aqueous formaldehyde solutions or the media of the high water content should not be used, but the water content of the system should be adjusted to be 3–15% by weight initially and the polymers of formaldehyde should be used, so that the polymeric formaldehyde dissolved in the catalysts layer may undergo acidic random degradation to yield the formaldehyde oligomer cations, and then, those oligomer cations react with benzene and/or toluene to yield the hydrocarbon resins, which were ascertained, by the infrared spectra, the elemental analysis and the molecular weight determination, etc., to possess high oxygen-contents and to contain ether linkages and especially much acetal linkages.

This invention relates to the aromatic hydrocarbons resins and the production, and more particularly to the aromatic hydrocarbon resins with oxygen content of 7–20% by weight, the molecular weight of 250–700, the viscosity of 200–80,000 centipoises (30° C.) and the specific gravity of 1.06–1.14 (30° C.).

These resins are produced by the condensation of at least one aromatic hydrocarbon selected from the group consisting of benzene and toluene with a polymeric formaldehyde having a polymerization degree of 10–3,000, said polymeric formaldehyde being present in an amount from 1 to 5 moles, expressed in formaldehyde monomer unit, per mole of said aromatic hydrocarbon and in the presence of sulfuric acid in the amount of 0.1–1.0 mole per mole of said aromatic hydrocarbon, or perchloric acid in the amount of 0.06–0.2 mole per mole of said aromatic hydrocarbon as the catalysts; and also in the presence of water in the amount of 3–15% by weight at the beginning of the reaction, at 70°–120° C. for 2–10 hours.

The general procedure of this invention may be described as follows: To benzene and/or toluene are added 1–5 moles (relative to a mole of aromatic hydrocarbon) polymeric formaldehyde such as paraformaldehyde or α-polyoxymethylene, and the resulting mixture is stirred well. To this mixture is slowly added 0.1–1.0 mole (relative to a mole of aromatic hydrocarbon) sulfuric acid or 0.06–0.2 mole (relative to a mole of aromatic hydrocarbon) perchloric acid. The initial water-content of the reaction medium is adjusted between 3 and 15%. Then, the temperature of the system is raised to a certain temperature between 70° and 120° C., and the mixture is stirred continuously at the temperature for a certain period of time, without removing the water, which is formed as the condensation reaction proceeds. After the reaction is over, the acid added as the catalyst is removed by such methods as neutralization, washing with water, centrifugal separation or the combination of these methods. The removal of the water contained and the unchanged starting materials by vacuum distillation at 30–60 mm. Hg gives the aromatic hydrocarbon resins in 60–95% yields $$\left(\frac{\text{resin}}{\text{aromatic hydrocarbons}+\text{formaldehyde}} \times 100\right)$$

There are used as polymeric formaldehydes employed in the present invention those having the degree of polymerization from 10 to 3,000, such as paraformaldehyde, α - polyoxymethylene, β - polyoxymethylene, γ - polyoxymethylene, and δ-polyoxymethylene.

Although the general procedure of this invention is as described above, the variation of the procedure to the particular uses will result in the resins of the very high viscosity and the very high oxygen content, those of the moderately high viscosity and the moderately high oxygen content, or those of the moderate viscosity and the moderate oxygen content. Thus, the resins possessing the desired values of the oxygen content, the molecular weight and the viscosity can be prepared by the selection of proper values of the water content, the amount of catalysts and the molar ratios of formaldehyde versus aromatic hydrocarbons. As the desirable requirements for practical purposes, it is preferable to adjust the initial water content of the reaction system between 4 and 8% by weight, the molar ratios of formaldehyde versus benzene and/or toluene between 1.1 and 1.8, the molar ratios of acid versus benzene and/or toluene as the catalyst between 0.1 and 0.3, the temperature of the reaction between 80° and 110° C. and the time of the reaction between 4 and 6 hours, in order to produce in 65–85% yields the resins possessing the oxygen content of 7.5–13.0% by weight the molecular weight of 280–380, the viscosity of 200–2000 centipoises (30° C.), and specific gravity of 1.06–1.08 (30° C.). Or, it is preferable to adjust the initial water content of the reaction system between 6 and 10% by weight, the molar ratios of formaldehyde versus benzene and/or toluene between 1.8–2.5, the molar ratios of acid versus benzene and/or toluene as the catalysts between 0.2 and 0.6, the temperature of the reaction between 80° and 110° C. and the time of the reaction between 5 and 8 hours, in order to produce in 65–85% yields the resin possessing the oxygen content of 9.5–15% by weight, the molecular weight of 340–480, the viscosity of 1000–8000 centipoises (30° C.) and the specific gravity of 1.07–1.10 (30° C.). Or, it is preferable to adjust the initial water content of the reaction system between 8 and 14% by weight, the molar ratios of formaldehyde versus benzene and/or toluene between 2.5 and 3.2, the molar ratios of acid versus benzene and/or toluene as the catalysts between 0.3 and 0.8, the temperature of the reaction between 80° and 110° C., and the time of the reaction between 2 and 4 hours, in order to produce in 65–82% yields the resin possessing the oxygen content of 12.0–18.0% by weight, the molecular weight of 450–660, the viscosity of 6000–80,000 centipoises (30° C.) and the specific gravity of 1.09–1.14 (30° C.).

The benezene- and/or toluene-formaldehyde resins prepared by this invention are viscous and light yellow to brown, and are sparingly soluble or insoluble in alcohols such as methanol and butanol, but are soluble in ketones such as acetone and methyl ethyl ketone, soluble in aromatic hydrocarbons such as benzene, toluene and xylene, soluble in tetrahydrofuran, dioxan, trichloroethylene, ethyl ether, pyridine, chloroform, carbon disulfide, carbon tetrachloride and acetic acid. However, when the molar ratios of formaldehyde versus benzene and/or toluene were larger than 5, the resins obtained were semisolid or solid and were sparingly soluble in the solvents mentioned above. The resins thus prepared are different from the ordinary viscous resins in every respect and possess the oxygen content of more than 30% and the average molecular weight of more than 1000.

In order to accomplish the objects of this invention, that is, in order to prepare in good yields the useful benzene- and/or toluene-formaldehyde resins possessing larger oxygen content, much acetal linkage, higher molecular weight and higher viscosity, it is necessary to regulate the water content of the reaction system. Therefore, it is very important, that the water content at the beginning of the reaction is regulated to be 3–15% relative to the total mass of the reaction system. When more than 15% of water is present, the resins formed contain oxygen but extremely little acetal linkages, and the molecular weight and the viscosity of the resins are low, and such resins do not have desirable properties. Moreover, the yields of the resin are extremely low (a few percent) and this method is of no commercial value. On the other hand, when the water content in the system is less than 3%, the molecular weight and the viscosity of the resins obtained are larger, but these resins do possess the moderate oxygen content, which is one of the characteristic and commercially significant advantages of the aromatic hydrocarbon resins. These resins do not undergo the condensation reaction with phenols easily, and consequently these resins are practically of no value for the purposes of molded articles, laminates or paints. For example, when the reaction was carried out with the concurrent azeotropic distillation of water of the system, the resins obtained possess the oxygen content of less than 2–3% and such resins may be used only as plasticizers, and cannot be used as the so-called thermosetting resins. Therefore, in order to prepare the good and practically applicable resins with well balanced properties, that is, with proper values of oxygen content, molecular weight and viscosity in good yields, it is necessary to regulate the water content to be 3–15% at the beginning of the reaction, and to carry out the reaction without removing the water formed by the condensation reaction.

It is also important to use the polymeric formaldehyde as the source of formaldehyde. The acid catalysts cleave these polymeric formaldehyde to yield the oligomers of formaldehyde with less degree of polymerization, the cations of which form the ether and acetal linkages with benzene or toluene, thus yielding the resins with much acetal linkages, much oxygen content and high molecular weight.

As for the molar ratios of formaldehyde versus aromatic hydrocarbons, both the oxygen content and the molecular weight increase with the molar ratios but the yields of the resin decrease. When the molar ratio becomes larger than 5, the extremely high viscous resins, or the semisolid or solid resins are obtained as described previously, which are the resins with extraordinary properties and are not the resins which this invention aims at. On the other hand, when the molar ratios are less than 1, the oxygen content of the resins formed is too little. Therefore, the molar ratios of 1–5 are the most appropriate in order to accomplish the objects of this invention.

As for the kind of catalysts, the strong acids such as sulfuric acid and perchloric acid can be used, but the weak acids such as formic acid and acetic acid cannot be used. Since sulfuric acid and perchloric acid easily dissolve the polymeric formaldehyde to form a solution, in which the random degradation of the polymeric formaldehyde easily takes place to yield the oligomer cations, and these acids are commercially inexpensive, the said acids are the most effective for the process of this invention. As for the amounts of the catalysts, they must not be too much or too little. Since the reactivity of benzene and toluene is very low, almost no reaction takes place when the concentration of the catalyst is too low. On the other hand, when the concentration of the catalyst is too high, the polymeric formaldehyde undergoes excessive decomposition to form almost monomeric cations and the formation of acetal linkage becomes very little, moreover, the ether and acetal linkages formed suffer further cleavage to yield the methylene linkages consequently the oxygen content of the resins is low, and the aromatic hydrocarbon resins aimed at by this invention are not obtained, although the yields and the molecular weight of the resins are high. Thus, the resins with desirable properties can be obtained only when 0.1–1.0 mole (relative to a mole of aromatic hydrocarbon) of sulfuric acid is present or 0.06–0.2 mole (relative to a mole of aromatic hydrocarbon) of perchloric acid is present. The fact that weak acids cannot be used as the catalysts is illustrated as follows. When formic acid was used as the catalyst, the yield of the resins was insignificantly low, and the examination of the resin by the molecular weight determination, elemental analysis and infrared spectra showed that this resin consists mainly of mono-cyclic arylmethanol or arylmethanol formate such as

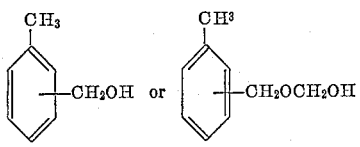

Thus, the use of formic acid as the catalyst does not result in the formation of the useful benzene-and/or toluene-formaldehyde resins aimed at by this invention.

It is difficult to cure the benzene-and/or toluene-formaldehyde resins obtained by this invention by heating them alone, this curing behavior being similar to the case of the so-called oxygen-containing aromatic hydrocarbons resins. Hence, the applications of the resins of this invention by themselves are limited to such purposes as some kinds of plasticizers or paints.

Therefore, owing to the presence of such reactive oxygen-containing groups as ether linkages and acetal linkages (especially the latter linkages), these resins are modified so as to be applicable to various practical purposes. One of the most important characteristics of the resins obtained by this invention is that they contain many acetal linkages so that they have high reactivity towards the third materials such as phenols.

As has been previously described, the xylene-formaldehyde resins and the naphthalene-formaldehyde resins have been known as the examples of the oxygen-containing aromatic hydrocarbon resins. But the application of the method of producing these resins to benzene or toluene is of no practical value, as mentioned earlier. As an illustration, a comparison between the conventional method with the reaction system containing much water and the new method of this invention is made in Table 1. The conventional method results in the resin of low viscosity, low molecular weight, low oxygen-content and, above all, of small number of oxygen atoms per an aromatic ring, even though a great amount of catalysts was used and the reaction time was made longer. It is very difficult to modify such resin to be useful for various purposes.

The benzene-and/or toluene-formaldehyde resins obtained by this invention can be modified by use of the various modifiers such as phenols, anilines, alkylphenols, ureas, organic carboxylic acids, amides, amines. And such resins can be used for very many purposes such as molding materials, laminating materials, paints, adhesives, plasticizers, thickeners, tackifiers and reinforcing fillers for synthetic rubbers, and printing inks, or can be used, after the special emulsion-resinification, as the finely dispersed resins for lubricating greases and adsorbents. For example, a toluene-formaldehyde resin obtained by this invention was modified with phenol, and the properties of the molded article made of this modified resins are shown in Table 2; the properties of the laminated sheet made of this modified resin are shown in Table 3. Tables 2 and 3 illustrate the excellent properties of the toluene-formaldehyde resin, and the resins is especially good in respect to its alkali resistance, water adsorption and electric properties. The laminates excels in respect to the punching, and it is remarkable that cold punching can be done for this laminates. This illustrates one of the characteristic advantages of the toluene-formaldehyde resins prepared by this invention.

TABLE 1

| | This invention | Conventional method |
|---|---|---|
| Toluene, g | 46 | 46 |
| Paraformaldehyde, g | 17.7 | 17.7 |
| (Purity of paraformaldehyde, percent wt.) | 85 | 85 |
| F/T (molar ratio) | 1 | 1 |
| Sulfuric acid, g. (purity) | 15 (80%) | 30 (80%) |
| Water added, g | 0 | 25 |
| Water content of system, percent wt | 7.2 | 28.4 |
| Reaction time, hrs | 4 | 6 |
| Yield (R/T+F), percent wt | 78 | 7.4 |
| Molecular weight | 404 | 2.4 |
| Viscosity, cp | 2,000 | 20 |
| Oxygen content, percent wt | 10.3 | 384 |

TABLE 2

*Properties of the molded articles made of toluene resin*

| Properties | JIS-K6915 PM-EG Standard Value | Toluene Resin |
|---|---|---|
| Insulation Resistance, as it is, MΩ | >$10^4$ | $10^7$~$19^9$ |
| Insulation Resistance, after boiled, MΩ | >$10^2$ | $10^4$~$10^6$ |
| Withstand Voltage, kv./mm | 10 | 10~16 |
| Dielectric Constant (1 mc.) | | 4.0~4.5 |
| tan δ (1 mc.), ×$10^{-4}$ | | 250~300 |
| Bending Strength, kg./mm.² | >6.0 | 8~10 |
| Impact Strength (shalpy), kg.-cm./cm.² | | 2~3 |
| Resistance towards Heat (140° C. 2 hrs.) | No change | No change |
| Resistance towards Alkali (5% NaOH, 6 hrs., 30° C.) | | No change |
| Specific Gravity | 1.25~1.40 | 1.25~1.40 |
| Shrinkage, ×$10^{-3}$ | | 6~8 |
| Water Absorption, mg./100 cm.² | | 30~45 |

TABLE 3

*Properties of laminates made of toluene resin*

| Properties | NEMA XXXP Standard | Toluene Resin |
|---|---|---|
| Dielectric Power Factor (1 mc.): | | |
| A, $10^{-4}$ | >350 | 290~320. |
| D-24/13, $10^{-4}$ | >350 | 295~325. |
| Dielectric Constant (1 mc.): | | |
| A | >4.6 | 4.1~4.3. |
| D-24/13 | >4.8 | 4.2~4.4. |
| Bending Strength A, p.s.i. | 12,000 | 21,000~23,000. |
| Water Absorption E±/105, percent | >1.0 | 0.3~0.5. |
| Withstand Voltage along layers: | | |
| A, kv | <60 | <60. |
| D-48/50, kv | <15 | 40~50. |
| Punching E-15 min./130: | | |
| Surface | ASTM D-709 55T | 80~90. |
| Edge | | 80~90. |
| Hole | | 90. |
| Insulative Resistance along layers: | | |
| A, MΩ | JIS-K6911 | $2.0 \times 10^6 \sim 2.0 \times 10^9$. |
| C-24/30/85, MΩ | | $6.0 \times 10^5 \sim 5.0 \times 10^6$. |
| D-2/100, MΩ | | $9.0 \times 10^2 \sim 3.0 \times 10^3$. |

NOTE.—Thickness of sample is 1.6 mm.

The following examples are given to illustrate the present invention in detail.

*Comparative Example 1.*—In a three-necked flask with a condenser were mixed 17.7 g. of paraformaldehyde (purity, 85%), 30 g. of 80% sulfuric acid and 25 g. of water, and the mixture was heated to dissolve the paraformaldehyde. Then 46 g. of toluene was slowly added. The water content in the system at this point was 28.4% and the content of sulfuric acid was 20.2%. The reaction mixture was then heated to 90°–110° C. with stirring, and was let to react by refluxing it for 8 hours. After the reaction was over, the reaction mixture was poured into water, the acid was removed by repeated washing with water, and the water and the unchanged toluene were distilled off at 60 mm. Hg with moderate heating. The light-colored, slightly viscous resinous material was obtained; 4.5 g. (7.4% yield). This resinous material possessed the oxygen content of 3.4%, the molecular weight of 284, and the viscosity of 20 centipoises (30° C.). When this resin was modified with phenol, the modified resin obtained was an oil, and it did not completely cure when heated with hexamethylenetetramine, and such sticky, viscous substance could not be used as molding material.

*Comparative Example 2.*—In a three-necked flask equipped with a condenser and a thermometer were mixed 33 g. of paraformaldehyde (purity, 91%) and 92 g. of toluene, and then 20.4 g. of 98% sulfuric acid was added to the mixture. The water content of the reaction mixture at this stage was 2.3% and the content of sulfuric acid was 14%. The molar ratio of formaldehyde versus toluene was 1:1. This mixture was let to react by refluxing it for 5 hours. The resinous material was obtained from the reaction mixture by the similar work-up as in Comparative Example 1. The resinous material obtained was 96 g. (79% yield), and possessed the oxygen content of 2.63% and the molecular weight of 300. The color of the resin was darkened. This resin was let to react with excess of phenol, and the unchanged phenol was steam-distilled and determined. It was found that the amount of phenol reacted was equivalent to the oxygen atoms present in the resin, and the more than half of the resin remained unreacted.

*Example 1.*—In a three-necked flask with a condenser were mixed 92 g. of toluene and 60 g. of paraformaldehyde (purity, 85%), and then 15 g. of 80% sulfuric acid was added slowly, and the water content of the system was 7.2%. The mixture was heated to 90°–110° C. with vigorous stirring, and was let to react by refluxing it for 6 hours. The refluxing temperature was about 92° C. at the beginning of the reaction, but rose as the reaction proceeded and was about 110° C. at the end of the reaction. After the reaction was over, the reaction mixture was poured into much water. The two layers system of the resin layer and the aqueous layer, was stirred vigorously. The repetition of this washing for several times removed thoroughly the sulfuric acid catalyst. Then the evaporation of water at 60 mm. Hg with moderate heating yielded 100 g. of light brown, viscous resin (70.6% yield). This resin possessed the oxygen content of 11.0%, the molecular weight of 334, the viscosity of 430 centipoises (30° C.) and the specific gravity of 1.06 (30° C.).

*Example 2.*—In a reaction vessel equipped with a condenser were mixed 78 g. of benzene, 35 g. of 98% α-polyoxymethylene (the degree of polymerization, 150) and 20 g. of 60% perchloric acid. The water content of the system was 6.0%. The mixture was let to react with vigorous stirring at 80° C. for 6 hours, and then the mixture was poured into water. After the removal of the acid by repeated washings and the evaporation of water at 60 mm. Hg with gentle heating, 93 g. (85% yield) of viscous nontransparent resin of yellowish brown color was obtained. This resin possessed the oxygen content of 12.0%, the molecular weight of 320, viscosity of 430 centipoises (30° C.) and the specific gravity of 1.07 (30° C.).

*Example 3.*—Ninety-two grams of toluene, 85 g. of 85% paraformaldehyde and 31 g. of 80% sulfuric acid were mixed, and the water content of the system was 9%. The mixture was let to react, as in the case of Example 1, at 90°–110° C. for 6 hours, and the reaction products were washed with water. When the water was removed, 120 g. of a light brown resin was obtained (72.6% yield). The resin possessed the oxygen content of 12.9%, the molecular weight of 376 and the viscosity of 2,300 centipoises (30° C.).

*Example 4.*—Ninety-two grams of toluene, 105 g. of 85% paraformaldehyde and 85 g. sulfuric acid were mixed, and the water content of the system was 11.6%. The mixture was let to react, as in the case of Example 1, at 90°–110° C. for 4 hours. When the reaction products were washed with water and the water was removed, 122 g. of light brown resin was obtained (67.0% yield). This resin possessed the oxygen content of 16.8%, the molecular weight of 562, the viscosity of 8,000 centipoises (30° C.) and the specific gravity of 1.11 (30° C.).

*Example 5.*—Ninety-two grams of toluene, 60 g. of 96% α-polyoxymethylene (the degree of polymerization, 230) and 30 g. of 98% sulfuric acid were mixed, and adding 15 g. of water the water content of the system was adjusted to be 9.2%. The mixture was let to react, as in the case of Example 1, at 92°–110° C. for 4 hours. When the reaction products were washed with water and then dehydrated, 104 g. of brown resin was obtained (69.5% yield). This resin was found to be 13.08% oxygen, and possessed the molecular weight of 480, the viscosity of 5,000 centipoises (30° C.) and the specific gravity of 1.08 (30° C.).

Example 6.—Ninety-two grams of toluene, 106 g. of 85% paraformaldehyde and 45 g. of 80% sulfuric acid acid were mixed, and the water content of the system was 11.2%. The mixture was let to react, as in the case of Example 1, at 96°–100° C. for 4 hours with stirring. When the reaction products were washed with water to remove the acid and then dehydrated, 129 g. of light yellow resin was obtained (70.8% yield). This resin possessed the oxygen content of 12.3%.

Example 7.—Ninety-two grams of toluene, 76 g. of 98% β-polyoxymethylene and 45 g. of 80% sulfuric acid were mixed, and then 12.3 g. of water was added to adjust the water content to be 10.4%. The mixture was let to react, as in the case of Example 1, at 90–110° C. for 3 hours. After the washings with water and the dehydration, 127 g. of light brown resin was obtained (76.0% yield). This resin possessed the oxygen content of 12.4%, the molecular weight of 532, the viscosity of 7000 centipoises (30° C.) and the specific gravity of 1.10 (30° C.).

Example 8.—Seventy-eight grams of benzene, 50 g. of 85% paraformaldehyde and 25 g. of 80% sulfuric acid were mixed, and the water content of the system was 8%. The mixture was let to react, as in the case of Example 1, at 80° C. for 6 hours. After the washings with water and the dehydration, 92.8 g. of light brown resin was obtained (76.9% yield). This resin possessed the oxygen content of 8.3%, the molecular weight of 358, the viscosity of 455 centipoises (30° C.) and the specific gravity of 1.07.

Example 9.—To 10 parts of the toluene-formaldehyde resin (the average molecular weight, 334; the oxygen content, 11.0%) obtained by Example 1, was added 10 parts of phenol, and they were mixed well. When 0.5% of benzoic acid (relative to the total amount of the mixture) was added to this and the mixture was stirred for 1–2 hours on a boiling water bath, a solid resin was obtained. When this solid resin is heated with hexamethylenetetramine, it easily sets to form the resin which does not dissolve nor melt. Or, this resin, fillers, hexamethylenetetramine, calcium stearate and other ingredients are blended and the compound is fed to a pair of rolls held at a controlled temperature and operated at a low differential in a speed; and the mixture was ground. The plastic mass is then cut from the rolls, sheeted out, and cooled. After cooling, the compound is fed to a series of crushers, grinders, and sieves where it is reduced to the desired fineness. The molding powder thus obtained was used to make a molding article, which possessed very good properties as has been shown in Table 2.

What is claimed is:

1. A process for producing condensation products containing 7 to 20% of oxygen by weight, which comprises condensing at least one aromatic hydrocarbon selected from the group consisting of benzene and toluene with a polymeric formaldehyde having a polymerization degree of between 10 and 3,000, said polymeric formaldehyde being present in an amount from 1 to 5 moles, expressed in formaldehyde monomer unit, per mole of said aromatic hydrocarbon, in the presence of sulfuric acid in an amount of 0.1 to 1.0 mole per mole of said aromatic hydrocarbon, or perchloric acid in an amount of 0.06 to 0.2 mole per mole of said aromatic hydrocarbon as the catalysts, and also in the presence of water in an amount of 3 to 15% by weight at the beginning of the reaction at 70° to 120° C. for 2 to 10 hours, under non-azeotropic conditions, whereby a polymeric condensation product of said aromatic hydrocarbon and said formaldehyde is formed having between 7 and 20% of oxygen, and recovering said polymeric product.

2. A process according to claim 1, in which the reaction is carried out in a medium with an initial water content of 4 to 8% in a proportion of 1.1 to 1.8 moles of formaldehyde per mole of said aromatic hydrocarbon in the presence of 0.1 to 0.3 mole of sulfuric acid as the catalyst.

3. A process according to claim 1, in which the reaction is carried out in a medium with an initial water content of 6 to 10% in a proportion of 1.8 to 2.5 moles of formaldehyde per mole of said aromatic hydrocarbon in the presence of 0.2 to 0.6 mole of sulfuric acid as the catalyst.

4. A process according to claim 1, in which the reaction is carried out in a medium with an initial water content of 8 to 14% in a proportion of 2.5 to 3.2 moles of formaldehyde per mole of said aromatic hydrocarbon in the presence of 0.3 to 0.8 mole of sulfuric acid as the catalyst.

5. A process according to claim 1 in which the aromatic hydrocarbon is toluene.

6. A process according to claim 2 in which the aromatic hydrocarbon is toluene.

7. A process according to claim 3 in which the aromatic hydrocarbon is toluene.

8. A process according to claim 4 in which the aromatic hydrocarbon is toluene.

9. A process according to claim 1 in which the polymeric formaldehyde is a member selected from the group consisting of paraformaldehyde, α-polyoxymethylene, β-polyoxymethylene, γ-polyoxymethylene and δ-polyoxymethylene.

10. The aromatic hydrocarbon-formaldehyde resin, which is obtained by the process according to claim 1 and possesses an oxygen content of 7 to 20% by weight, a molecular weight of 250 to 700, a viscosity of 200 to 80,000 centipoises (30° C.) and a specific gravity of 1.06 to 1.14 (30° C.).

11. The aromatic hydrocarbon-formaldehyde resin which is obtained by the process according to claim 2 and possesses an oxygen content of 7.5 to 12.0% by weight, a molecular weight of 280 to 380, a viscosity of 200 to 2,000 centipoises (30° C.), and a specific gravity of 1.06 to 1.08 (30° C.).

12. The aromatic hydrocarbon-formaldehyde resin which is obtained by the process according to claim 3, and possesses an oxygen content of 9.5 to 15.0% by weight, a molecular weight of 340 to 480, a voscosity of 1,000 to 8,000 centipoises (30° C.), and a specific gravity of 1.07 to 1.10 (30° C.).

13. The aromatic hydrocarbon-formaldehyde resin which is obtained by the process according to claim 4, and possesses an oxygen content of 12.0 to 18.0% by weight, a molecular weight of 450 to 660, a viscosity of 6,000 to 80,000 centipoises (30° C.) and a specific gravity of 1.09 to 1.14 (30° C.).

References Cited by the Examiner

UNITED STATES PATENTS

| | | | |
|---|---|---|---|
| 2,713,571 | 7/1955 | Gordon et al. | 260—67 |
| 2,954,360 | 9/1960 | Krzikalla et al. | 260—67 |
| 3,000,859 | 9/1961 | Mirviss et al. | 260—67 |
| 3,116,265 | 12/1963 | Huang et al. | 260—67 |

OTHER REFERENCES

Wegler: Angewandte Chemie, A60, 88–96 (1948) QD1Z5.

Walker: Formaldehyde, A.C.S. Monograph Series No. 159 (Reinhold Publishing Co., N.Y.), third edition, p. 439, QD 305 A6W3, 1964.

Walker: Formaldehyde, A.C.S. Monograph Series No. 120 (Reinhold Publishing Co., N.Y.), second edition, pp. 342–344 and 352, QD 305 A6W3, 1953.

WILLIAM H. SHORT, *Primary Examiner.*

L. M. MILLER, *Assistant Examiner.*